(No Model.) 2 Sheets—Sheet 1.
L. A. COOPER.
BICYCLE.
No. 538,238. Patented Apr. 30, 1895.
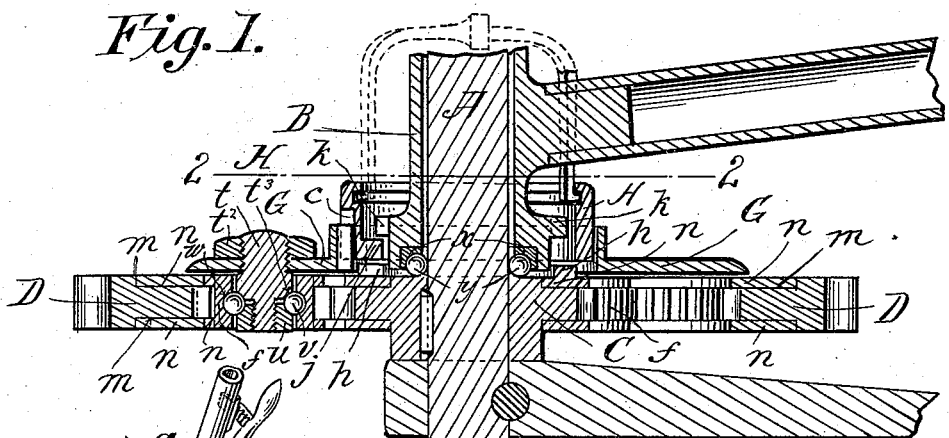
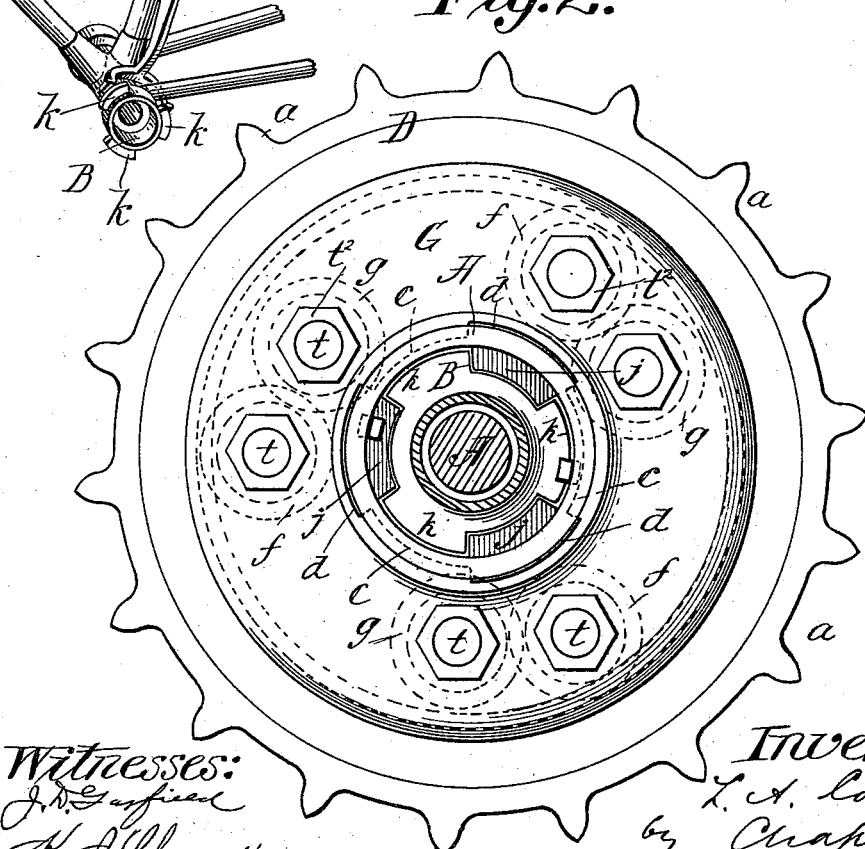
Witnesses:
Inventor:
L. A. Cooper (No Model.) 2 Sheets—Sheet 2.

L. A. COOPER.
BICYCLE.

No. 538,238. Patented Apr. 30, 1895.

Witnesses:
Inventor,
Leslie A. Cooper
by Chapin & Co. attys

UNITED STATES PATENT OFFICE.

LESLIE A. COOPER, OF SPRINGFIELD, MASSACHUSETTS, ASSIGNOR OF ONE-THIRD TO EDWARD H. WILKINSON, OF SAME PLACE.

BICYCLE.

SPECIFICATION forming part of Letters Patent No. 538,238, dated April 30, 1895.

Application filed May 31, 1894. Serial No. 512,994. (No model.)

*To all whom it may concern:*

Be it known that I, LESLIE A. COOPER, a citizen of the United States, residing at Springfield, in the county of Hampden and State of Massachusetts, have invented new and useful Improvements in Bicycles, of which the following is a specification.

This invention for improvements in velocipedes particularly relates to improvements in speed and power driving mechanism which may be shifted from the ordinarily high driving speed to a lower speed with greater power, and vice versa.

An object of the invention is to so improve the speed and power driving mechanism that when running at the usual higher speed all parts of the gear will move as one, and hence there will be no extra part relatively to which the usual driving mechanism moves that will become an element of friction.

Another object of the invention is to attain in the mechanism compactness, simplicity, and the inclusion of a comparatively small number of parts, and the avoidance of material additional weight; and a still further advantage arising consists in the adaptability of the mechanism to any of the ordinary types of bicycles.

To these ends the invention consists in the construction and combination of parts, all substantially as will hereinafter fully appear and be set forth in the claims.

Reference is to be had to the accompanying drawings, in which—

Figure 3:
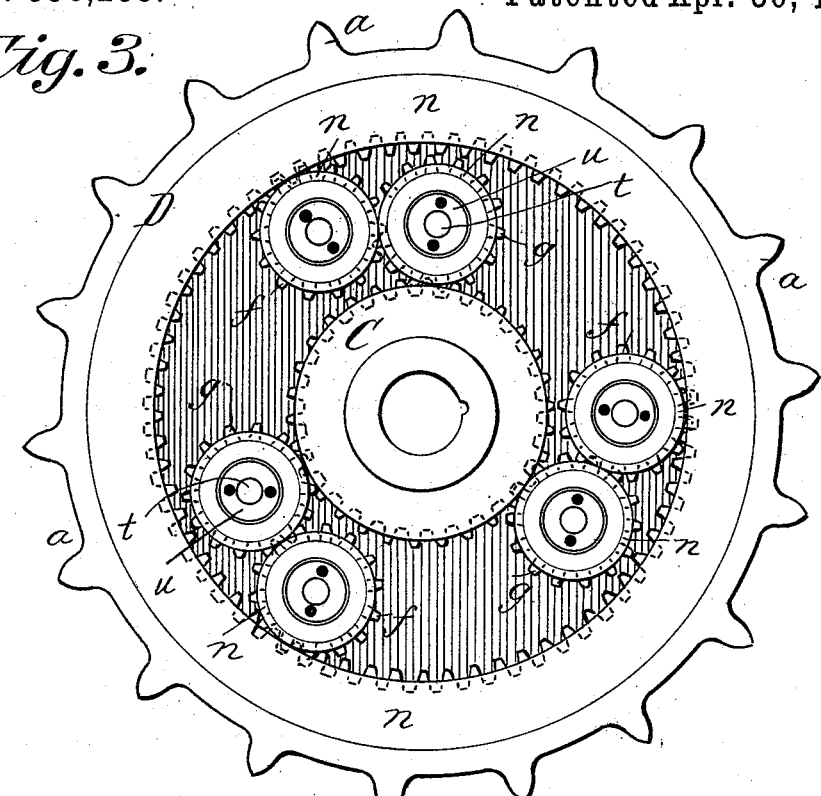
Figure 4:
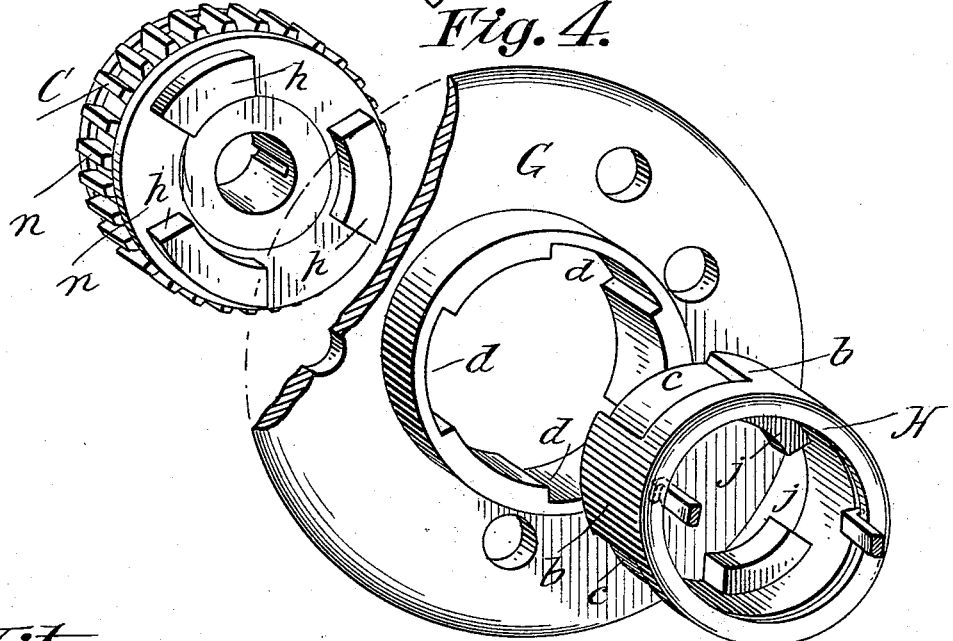

Figure 1 is a horizontal section taken longitudinally through the crank-shaft and its bracket, or "hanger" and also centrally through the improved mechanism which is applied at this part of the bicycle. Fig. 1ª is a perspective view showing on the bicycle frame, which is in part illustrated, the lever for shifting the change gear. Fig. 2 is a sectional view across the bracket and crank-shaft on line 2—2, Fig. 1, with the parts outside of the plane of section seen in face view. Fig. 3 is an outer face view of the gearing. Fig. 4 is a perspective view of a part herein termed the carrier, of a spur gear to be fixed on the hub and of a member of a clutch device which parts will be hereinafter more particularly referred to.

Similar characters of reference indicate corresponding parts in all of the views.

A represents the crank-shaft having its bearings as usual in the bracket, or hanger, B. This crank-shaft has the spur gear, C, keyed, or otherwise immovably fixed, thereon.

D represents the annular part which outwardly is constructed with the teeth, $a$, to constitute the sprocket-wheel, while internally this part has the continuous series of teeth whereby this part also becomes a circular rack or internal gear. This sprocket and internal gear is concentric with, and in the plane of rotation of, the said crank-shaft-gear, C.

G represents an annular part which very loosely surrounds the hanger, B, inside of the gears, C and D, and this part G carries on its side three pairs of pinions, $f, g$. One pinion, $f$, of each pair is in mesh with the internal gear, D, while the other pinion, $g$, of the pair is in mesh with the spur-gear, C, and with the pinion, $f$, the two being necessary so that rotations of the crank-shaft and gear, D, will cause, when permitted on the proper shifting of the mechanism through the rotations of the pinions, the turning of the internal gear and sprocket-wheel in the same direction.

Within the hub of the carrier, G, is the sliding sleeve, H. The carrier, G, has internally the wide grooves, or apertures, $d$, extending through from end to end of the hub of such part, G, while the sleeve, H, has, externally, the separated wide ribs, or teeth, $b$, which slide with a free fit through said grooves, $d$, so that the carrier and sleeve must at all times turn in unison. The inner end face of the spur-gear which is fixed on the crank-shaft is constructed to have a clutch engagement with the said sliding collar,—when the collar is slid outwardly,—by reason of the endwise projections, $h, h$, which may engage between the internal teeth or lugs, $j, j$, of the said collar. The said collar, moreover, by reason of the said teeth, or lugs, $j, j$, which are at its end nearer the inner face of the gear, C, will,—when the collar is slid to its inward limit have interengaging relations with the outstanding teeth, $k$, at the external periphery of the bracket or crank-shaft support, B.

Now noting, for instance, Fig. 1, in conjunction with the description given, it will be apparent that the sleeve may have any one of three positions, accordingly as the sleeve-operating lever is manipulated, that is, first, the sleeve may have the position shown when the sleeve and pinion carrier, C, will be out of clutch with both the bracket and the spur-gear, and in this case the cranks might be turned without effect on the sprocket-wheel, or the sprocket wheel may turn, as in coasting, without effect to turn the cranks, for the cranks being held stationary by the feet on the pedals, the sprocket and carrier may rove around on the spur-gear, C, without any practical effect; secondly, the sleeve may be slid axially outward to be placed into a clutch engagement with the teeth, $h$, of the spur-gear and now the pinion carrier, G, is as one with the spur-gear, C, and the rotations of the crank-shaft by the pedal cranks will,—through the medium of the now immovable pinions which under said conditions serve as spokes between the crank and internal gear, be prevented, the spur gear being regarded as the hub from which the spokes practically radiate,—whereupon, of course, the power imparted through the pedal to the crank-shaft causes the movement in unison with such shaft of the internal-sprocket, D, and, thirdly, the sleeve, H, may be slid axially in the other direction to place the pinion-carrier in clutch with a stationary part of the bicycle, that is, in this instance with the toothed bracket. Now the rotations of the crank-shaft and its spur-gear, C, effect the rotations of the pinions, and through them of the internal gear and sprocket-wheel, D. Now, of course, the complete rotations of the crank-shaft will have to effect only such parts of rotations of the wheel, D, as the number of teeth of gear, C, is fractional of the number of teeth comprised in the sprocket-gear, and with this reduced speed is derived correspondingly increased power.

Now, in the device which has been thus far described, it is deemed advantageous to so set up the revoluble, or rotating parts that the spur-gear, C, supports the gears, $g$, which in turn support gears, $f$, which again form the bearings for the internal gear, all in such a manner that the weight, or strain, of the parts is not upon, or borne by, the teeth of the respective gears. Thus it will be seen that each gear, C, $f$, $g$, or internal gear, D, has its side face,—or opposite side faces,—rabbeted, as seen at $m$, on which rabbeted part is "shrunk on," or otherwise secured, the ring, $m$, the smooth outer edge of which is exactly coincident with the pitch circle of the gear on which the ring is placed.

The pinions, $f$ and $g$, which are carried by the carrier, G, are journaled and have ball-bearings in the following manner: The journal-stud, $t$, for each of the pinions is, as clearly seen in Fig. 1, provided with the intermediate enlargement, its stem-like part at each extremity being screw-threaded. The larger screw-threaded end portion is set through the perforation in the carrier, G, and held with its shoulder hard against the face of the carrier, by the nut, $t^2$. The circular corner of the shoulder of the stud, opposite that which lies against the carrier is beveled, or chamfered as seen at $t^3$, to form one member of the ball-bearing between which and the cone-nut, $u$, which screws on the smaller screw-threaded stem-like extremity of the stud, $t$, are comprised the hardened balls, $v$. The pinions are internally formed with the peripheral grooves or ball-races, as seen at $w$. The balls may serve to hold the pinions in place on the journal-stud, so long as they are prevented from being displaced by the said cone-nut, $n$.

It will furthermore be observed on reference to Fig. 1 that the bracket, B, has within its cupped end a series of balls, $y$, which stand between the radially outermost peripheral part of the cup formed ball-way, $x$, and the crank-shaft. The said balls are of a size relative to the depth of the ball-way and bracket as to stand endwise beyond the bracket and against the inner face of the spur-gear, C, which rotates in unison with the crank-shaft and which is in proximity to the end of the bracket; and these balls therefore perform the double bearing duty, as is obvious.

Having thus described my invention, what I claim, and desire to secure by Letters Patent, is—

1. In a bicycle, the combination with the crank-shaft bracket, and the crank-shaft having a gear wheel fixed thereon, of an annular carrier loosely surrounding the bracket and being without frictional contact thereupon, and having several pairs of intermeshing pinions, one of each pair gearing into the crank-shaft gear, the internal gear widely surrounding the crank-shaft gear and meshing with the outer ones of the several pairs of pinions, and it and said annular carrier receiving their entire support through said pairs of pinions, primarily from the shaft-gear, a clutch sleeve loosely surrounding the bracket and adapted for a spline-like engagement with said pinion carrier and having teeth or projections which in one position of the sleeve engage the bracket and in the other position of the sleeve engage the crank-shaft gear and means for operating the sleeve, substantially as and for the purposes set forth.

2. In a bicycle, the combination with the bracket and crank-shaft having the gear-wheel, C, the combined sprocket-wheel and internal gear, D, concentrically surrounding the gear-wheel, C, the annular carrier, G, widely and loosely surrounding said bracket and having its position to one side of the internal-gear-and-sprocket, and having the studs, $t$, fixed upon and extended sidewise from the said annular carrier, within the internal gear, and having the screw-threaded stem, at the base of which is the shoulder or cone to form one member of a ball-bearing, the internally peripherally grooved pairs of intermeshing pinions set upon said studs, and meshing with the internal gear and the crank-shaft gear, the balls and the cone-nuts, $u$, screwing on said stems against the balls and the clutch-sleeve, H, and means for operating it, substantially as and for the purposes set forth.

3. In a bicycle, the combination with the crank-shaft bracket, and the crank-shaft having a gear-wheel fixed thereon which is constructed at one or both side faces thereof with rims in circles coincident with the pitch-line, of an annular carrier loosely surrounding the bracket and being without frictional contact thereupon, and having several pairs of intermeshing pinions, all with similar pitch-line circular rims at their sides, one of each pair gearing into the crank-shaft gear, the internal gear widely surrounding the crank-shaft gear and meshing with the outer ones of the several pairs of pinions and having at the sides of its teeth the pitch-line circular rim, said internal gear and the annular carrier receiving their support entirely and solely through said so rimmed pairs of pinions primarily from the shaft-gear, a clutch sleeve loosely surrounding the bracket and adapted for a spline-like engagement with said pinion carrier and having teeth or projections which in one position of the sleeve engage the bracket and in the other position of the sleeve engage the crank-shaft-gear, and means for operating the sleeve, substantially as and for the purposes set forth.

4. In a bicycle, in combination, the crank-shaft supporting bracket, B, having the external teeth, $k$, the crank-shaft, A, having the spur-gear wheel, C, fixed thereon next outside of the end of said bracket, and having on its inner side face the inwardly projecting lugs, $h$, the combined sprocket-wheel and internal gear, D, concentrically surrounding the gear, C, the annular carrier, G, having within its hub opening the apertures, $d$, which extend parallel with its axis, and carrying the several pairs of meshing pinions which also mesh with the said crank-shaft gear, C, and the internal gear, and which constitute solely and entirely the means of support for the said annular carrier and internal gear primarily from the crank-shaft gear, the slide-collar, H, movable endwise upon the bracket and having externally a spline-engagement with the said carrier, G, having the internal lugs, $j$, to engage those, $h$, of the crank-shaft gear and having projections to engage the said bracket-teeth, $k$, and means for moving the collar axially, substantially as described.

LESLIE A. COOPER.

Witnesses:
WM. S. BELLOWS,
K. I. CLEMONS.